United States Patent [19]

Yanagihara et al.

[11] 4,336,777
[45] Jun. 29, 1982

[54] INTAKE PASSAGE MEANS OF AN INTERNAL COMBUSTION ENGINE

[75] Inventors: Masanobu Yanagihara, Kawasaki; Yoichiro Kaneuchi, Yokohama; Shoji Kobayashi, Yokosuka, all of Japan

[73] Assignee: Nissan Motor Co., Ltd., Yokohama, Japan

[21] Appl. No.: 147,169

[22] Filed: May 6, 1980

[30] Foreign Application Priority Data

May 15, 1979 [JP] Japan .......................... 54-64469[U]

[51] Int. Cl.³ ............................................. F02B 31/00
[52] U.S. Cl. ................................. 123/306; 123/188 M
[58] Field of Search .......... 123/193 R, 193 H, 188 M, 123/306, 590, 52 M

[56] References Cited

U.S. PATENT DOCUMENTS

| | | | |
|---|---|---|---|
| 2,920,613 | 1/1960 | Vogel et al. | 123/188 M |
| 3,035,558 | 5/1962 | Wiebicke et al. | 123/188 M |
| 4,038,950 | 8/1977 | Konomi et al. | 123/52 M |
| 4,196,703 | 4/1980 | Okitsu et al. | 123/188 M |
| 4,207,854 | 6/1980 | Alford et al. | 123/188 M |
| 4,308,829 | 1/1982 | Yamada et al. | 123/188 M |
| 4,308,830 | 1/1982 | Yamada et al. | 123/188 M |

FOREIGN PATENT DOCUMENTS

| | | | |
|---|---|---|---|
| 2923606 | 3/1980 | Fed. Rep. of Germany | 123/188 M |
| 591112 | 6/1957 | Italy | 123/188 M |

*Primary Examiner*—Craig R. Feinberg

[57] ABSTRACT

The disclosed intake passage means of an internal combustion engine has an intake port bored through a cylinder head so as to communicate with a combustion chamber, said cylinder head being connected to an intake manifold with a gasket disposed therebetween, a guide plate causing a part of air-fuel mixture flow to swirl in a cylinder of the engine, and an insert holding said guide plate on inner wall surface of said intake port, said guide plate and said insert being integrally formed with said gasket.

2 Claims, 4 Drawing Figures

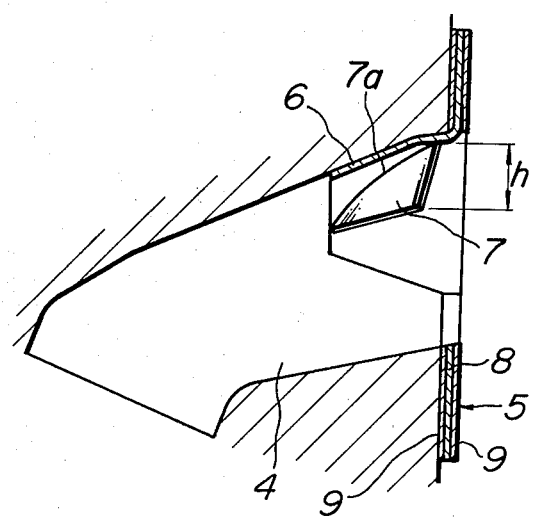
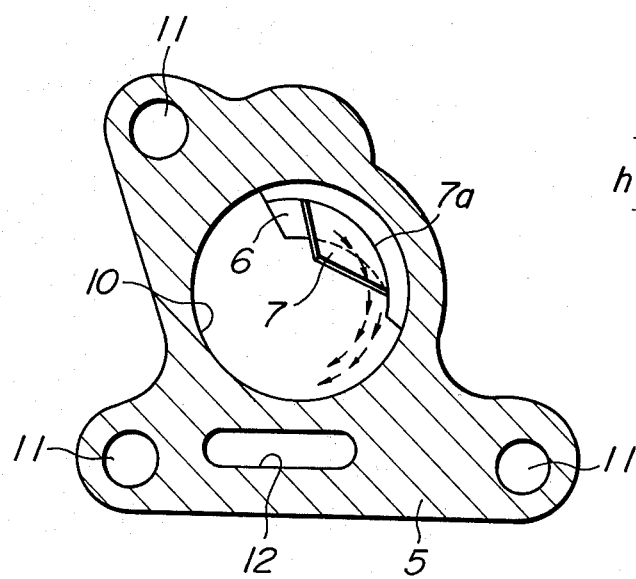

INTAKE PASSAGE MEANS OF AN INTERNAL COMBUSTION ENGINE

BACKGROUND OF THE INVENTION

1. Field of the Invention

This invention relates to an improvement of intake passage means of an internal combustion engine, by providing a guide plate on the inner peripheral wall of an intake port bored through a cylinder head for communication with a combustion chamber, so that a strong swirl is generated in the intake air-fuel mixture especially at the time of slow running of the engine.

2. Description of the Prior Art

To improve the combustion during light load operation of an internal combustion engine, it has been known to provide a deflector or a guide vane in an intake port of conventional construction as means for generating swirl in intake air-fuel mixture flow. The known means has a shortcoming in that, during heavy load operation of the engine with good combustion, resistance against gas flow therethrough unduly increases, because it controls and rectifiers the entire intake air-fuel mixture in the intake passage, and the increased resistance results in a reduction of the amount of intake air and a considerable reduction of the engine output.

The inventor has proposed to positively revolve a part of intake air-fuel mixture flow during slow running of the engine to cause a strong swirl without increasing resistance against gas flow.

The modified intake passage means, however, has difficulties in that the accurate positioning of the guide plate is not easy and its position tends to be inaccurate, because the guide plate is formed separately from the gasket of an intake manifold. Besides, the airtightness is not perfect.

SUMMARY OF THE INVENTION

Therefore, an object of the present invention is to obviate the aforesaid shortcoming and difficulties of the prior art, by providing an improved intake passage means for an internal combustion engine, wherein a guide plate for swirling a part of intake air-fuel mixture flow and an insert for securing the guide plate at a preselected position of an intake port are integrally formed with a gasket to be disposed between an intake manifold and a cylinder head.

BRIEF DESCRIPTION OF THE DRAWING

For a better understanding of the invention, reference is made to the accompanying drawing, in which:

FIG. 2 is a vertical sectional view, as seen from the right in FIG. 1, of an intake port with an insert and a guide plate secured thereto;

FIG. 3 is a front view of a gasket, as seen from the direction of the arrows III—III of FIG. 1; and FIG. 4 is a plan view of the guide plate.

Like parts are designated by like numerals and symbols throughout different views of the drawing.

DESCRIPTION OF THE PREFERRED EMBODIMENT

Figure 1:
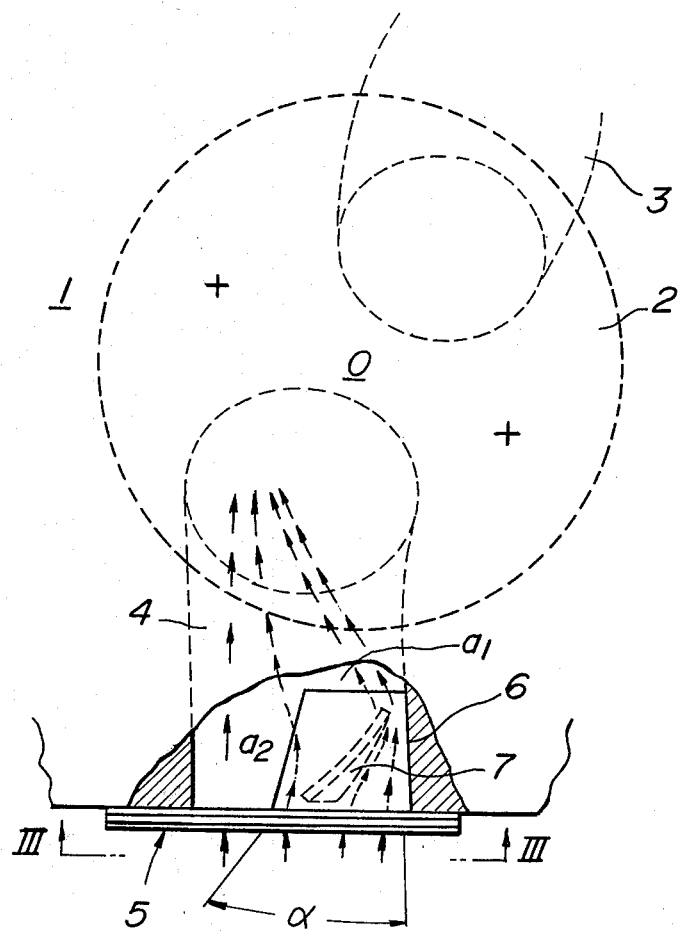
FIG. 1 is a schematic plan view, showing the entire arrangement of the present invention.

The accompanying FIG. 1 through FIG. 4 illustrate an embodiment of the present invention.

Referring to FIG. 1, a cylinder head 1 faces a combustion chamber 2, and an exhaust port 3 and an intake port 4 are disposed with the centers thereof offset from the center 0 of an engine cylinder and communicate with the engine cylinder from above. The intake port 4 has a hollow notched cylindrical insert 6 detachably fitted therein, which insert is integrally formed with a gasket 5 so as to extend from the gasket into the intake port 4.

An elongated triangular thin guide plate 7 as shown in FIG. 4 is integrally secured to the top inner peripheral wall surface of the insert 6 so as to extend toward the cylinder center side of the insert, by die casting or pressing. As shown in FIGS. 2 and 3, the disposition of the guide plate 7 is such that its width h decreases as the guide plate extends toward the downstream of the flow of intake air-fuel mixture. The guide plate 7 has a fixing portion 7a to be fixed to the insert 6, so that the guide plate can extend spirally over about one quarter of the circumference of the inner periphery of the intake port 4. The mounting angle $\alpha$ of the guide plate 7 relative to the longitudinal axial direction of the intake port 4, as shown in FIG. 1, is set at about 40°. The gasket 5 with the insert 6 and the guide plate 7 integrally formed therewith by die casting or pressing has a flange-like plate 8, which plate 8 has graphite asbestos coatings 9 secured to front and rear surfaces thereof. The gasket 5 also has an opening 10 for passage to the intake port, and a plurality of bolt holes 11 are bored around the opening 10, and a coolant passage 12 is bored therethrough below the opening 10, as seen in FIG. 3.

The shape and the relative mounting position of the guide plate 7 have been determined based on the result of various experiments. More particularly, if the guide plate 7 is of an elongated triangular shape and is secured to the upper inner wall surface of the insert 6 so as to extend spirally about one quarter of the circumferential periphery of the port toward the cylinder center side of the port, with the width h of the guide plate 7 becoming narrower as the plate 7 extends toward the combustion chamber, then the flow of the intake air-fuel mixture can be controlled with positive flow rectification at portions where the amount of the air-fuel mixture flow is the largest during the light load running of the engine, so that a strong swirl can be caused in the engine cylinder under such conditions. Therefore, the mounting position of the guide plate 7 must be accurate. If the mounting is inaccurate, sufficient swirl may not be produced.

In the present invention, the insert 6 supporting the guide plate 7 is integrally formed with the gasket 5 to be disposed between the cylinder head 1 and the intake manifold (not shown) as explained above, so that as the gasket 5 is fastened by using the bolt holes 11, the guide plate 7 is automatically disposed at the correct position of the intake port 4. Consequently, the positioning of the guide plate 7 is greatly simplified for improving the operative efficiency and the desired effect of obtaining the best swirl can be achieved. Besides, as compared with the construction of the prior art with separately mounted gasket 5 and insert 6, the airtightness and oiltightness can be also improved.

The operation of the intake passage means according to the invention will be described.

The intake port 4 is curved as shown in FIG. 2, and when the intake air-fuel mixture flows through the intake port 4 during the light load running of the engine, the flow rate at the outer side (upper side in FIG. 2) is high and a large amount of the mixture passes there.

Accordingly, the cylinder center side flow $a_1$ of the total flow in the intake port 4 collides with the guide plate 7 and turns toward the inner wall surface of the cylinder for joining with the cylinder periphery side flow $a_2$ there. Thus, an air-fuel mixture flow along the inner peripheral surface of the cylinder is produced, and a strong swirl in a clockwise direction as seen in FIG. 1 can be effectively generated.

On the other hand, such strong swirl of the intake mixture is necessary only during light load running of the engine at a low speed accompanied with a small amount of the intake air-fuel mixture and comparatively poor combustion. When the engine is run at a high speed with a heavy load, the intake air-fuel mixture is almost perfectly burnt and the generation of the swirl is not so important. On the contrary, during fast running with a heavy load, the means for generating the strong swirl tends to cause a considerable reduction in flow coefficient. With the present invention, only a part of the intake air-fuel mixture is revolved by the guide plate 7 having the narrowed tip as described above, so that when the amount of the air intake is large, the overall effect of the resistance becomes small, and the guide plate 7 having the narrowed tip provides flow rectifying action for suppressing the turbulent flow. Thus, the present invention prevents any reduction of the intake efficiency during heavy load operation.

More particularly, the guide plate 7 mounted in the intake port 4 acts to positively revolve a part of the intake air-fuel mixture flow during slow running of the engine, so that a strong swirl is caused in the combustion chamber 2 for improving the mixing of the fuel with air. Accordingly, the rate of flame propagation becomes high for achieving the effect of improved combustion, and the output is also improved. The guide plate 7 does not change the flowing direction of the entire intake air-fuel mixture, so that it does not disturb the flow of large amount of the intake air-fuel mixture during the fast running of the engine, and a good filling efficiency can be ensured while improving the output.

As described in the foregoing, in the construction according to the present invention, a guide plate and an insert are integrally formed with a gasket, so that the registration of the guide plate in position is greatly simplified. Accordingly, the operative efficiency in assembling and maintenance can be improved. Furthermore, since the guide plate is always kept at a correct position relative to the intake port with a correct inclination, the aforesaid excellent operating performance owing to the guide plate can be always fully achieved.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An intake passage means for an internal combustion engine with a cylinder head having an intake port bored therethrough so as to communicate with a combustion chamber, said intake passage means comprising a gasket connected to said cylinder head, an insert integrally formed with said gasket and extending into said intake port on one side thereof, and a guide plate integrally formed with said gasket and supported by said insert and shaped such that said guide plate narrows in a downstream direction inclined towards a circumference of an inner periphery of said intake port and extends spirally over about one quarter of the circumference of the inner periphery of said intake port.

2. An intake passage means as set forth in claim 1, wherein a plane of said guide plate defines an angle of about 40° with the longitudinal axial direction of said intake port.

* * * * *